(12) United States Patent
Kim et al.

(10) Patent No.: US 12,330,676 B2
(45) Date of Patent: Jun. 17, 2025

(54) METHOD AND APPARATUS FOR PROVIDING DRIVING PATTERN LEARNING

(71) Applicants: Hyundai Motor Company, Seoul (KR); Kia Corporation, Seoul (KR)

(72) Inventors: Woo Hyun Kim, Suwon-si (KR); Jung Seok Suh, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 304 days.

(21) Appl. No.: 18/049,316

(22) Filed: Oct. 25, 2022

(65) Prior Publication Data

US 2023/0264711 A1 Aug. 24, 2023

(30) Foreign Application Priority Data

Feb. 21, 2022 (KR) ........................ 10-2022-0022172

(51) Int. Cl.
*B60W 60/00* (2020.01)
*B60K 35/00* (2024.01)
(Continued)

(52) U.S. Cl.
CPC ........... *B60W 60/001* (2020.02); *B60K 35/00* (2013.01); *B60W 40/08* (2013.01); *B60K 35/22* (2024.01);
(Continued)

(58) Field of Classification Search
CPC ............... B60W 60/001; B60W 40/08; B60W 2050/0062; B60W 2556/45; B60W 10/20; B60W 60/0051; B60W 2050/007; B60W 2050/143; B60W 2050/146; B60W 2554/802; B60W 40/107; B60W 2540/30; B60W 2556/10; B60W 10/18; B60W 40/09; B60W 50/082; B60W 50/14; B60W 60/0053; B60W 30/16; B60W 30/18; B60W 30/18109; B60W 30/18145; B60K 35/00; B60K 35/22; B60K 35/28; B60K 2360/175; B60K 2360/595; B60K 35/85; B60K 35/10; B60R 1/04; B60R 1/06

See application file for complete search history.

(56) References Cited

U.S. PATENT DOCUMENTS 7,734,419 B2 * 6/2010 Kondoh ............... B60K 26/021
340/436
7,742,864 B2 * 6/2010 Sekiguchi .......... B60K 31/0008
180/169

(Continued)

FOREIGN PATENT DOCUMENTS

KR 102013590 B1 8/2019

*Primary Examiner* — Mussa A Shaawat
(74) *Attorney, Agent, or Firm* — Slater Matsil, LLP (57) ABSTRACT

An embodiment driving pattern learning apparatus includes a driving mode selection unit configured to receive an autonomous driving mode or a driving pattern learning mode using an input unit, a driving pattern learning unit configured to learn a driving pattern of a user comprising acceleration, braking, steering, an inter-vehicle distance, a lane change, overtaking, or a response to road facilities based on a process of driving by the user in the driving pattern learning mode, and a memory configured to store the driving pattern learned by the driving pattern learning unit.

20 Claims, 6 Drawing Sheets

(51) Int. Cl.
  *B60W 40/08* (2012.01)
  *B60W 50/00* (2006.01)
  *B60K 35/22* (2024.01)
  *B60K 35/28* (2024.01)

(52) U.S. Cl.
  CPC ........ *B60K 35/28* (2024.01); *B60K 2360/175* (2024.01); *B60W 2050/0062* (2013.01); *B60W 2556/45* (2020.02)

(56) References Cited

U.S. PATENT DOCUMENTS

| | | | | |
|---|---|---|---|---|
| 8,260,515 | B2* | 9/2012 | Huang | B60W 40/09 |
| | | | | 701/1 |
| 8,392,065 | B2* | 3/2013 | Tolstedt | G05D 1/0214 |
| | | | | 701/41 |
| 8,634,980 | B1* | 1/2014 | Urmson | G06T 7/521 |
| | | | | 701/23 |
| 2009/0287367 | A1* | 11/2009 | Salinger | G05D 1/0246 |
| | | | | 701/23 |
| 2010/0063663 | A1* | 3/2010 | Tolstedt | G05D 1/0231 |
| | | | | 701/41 |
| 2010/0063680 | A1* | 3/2010 | Tolstedt | G05D 1/0214 |
| | | | | 701/1 |
| 2010/0179720 | A1* | 7/2010 | Lin | G07C 5/008 |
| | | | | 701/31.4 |
| 2010/0256836 | A1* | 10/2010 | Mudalige | G08G 1/22 |
| | | | | 701/25 |
| 2012/0277947 | A1* | 11/2012 | Boehringer | B60W 30/17 |
| | | | | 701/23 |
| 2019/0025842 | A1 | 1/2019 | Kim | |
| 2019/0072974 | A1* | 3/2019 | Hwang | G01C 21/3415 |
| 2020/0108867 | A1* | 4/2020 | Eom | B60W 50/14 |
| 2020/0371518 | A1* | 11/2020 | Kang | B60W 60/001 |
| 2022/0297633 | A1* | 9/2022 | Castaldini | B60H 1/00878 |
| 2022/0315039 | A1* | 10/2022 | Wada | G01C 21/3896 |
| 2023/0227075 | A1* | 7/2023 | Suh | B60W 50/14 |
| | | | | 701/23 |

* cited by examiner

METHOD AND APPARATUS FOR PROVIDING DRIVING PATTERN LEARNING

CROSS-REFERENCE TO RELATED APPLICATIONS

This application claims the benefit of Korean Patent Application Number 10-2022-00022172, filed on Feb. 21, 2022, which application is hereby incorporated herein by reference.

TECHNICAL FIELD

The present disclosure relates to a driving pattern learning apparatus and method.

BACKGROUND

Description of this section only provides the background information of embodiments of the present disclosure without configuring the related art.

As a part of an Advanced Driver Assistance System (ADAS), there is an autonomous driving technology that enables a vehicle to drive by itself without intervention of a driver. The technology of autonomous driving is divided into levels 0 to 5 based on the degree of autonomous driving. The larger the number of the level, the more the functions of a vehicle are autonomous.

A driver drives in person at the autonomous driving level 0. At the autonomous driving level 3, autonomous driving is possible in predetermined sections and a vehicle can take measures against sudden situations by itself by monitoring a road environment, a traffic situation, the positions of obstacles, etc. At the autonomous driving level 5, a vehicle drives by itself to a destination completely without intervention of a driver and all functions relating to movement of the vehicle such as parking are completely automated.

Users have different driving patterns. For example, there are users who want to keep a slightly longer inter-vehicle distance for safety, while there are other users who want to keep a slightly shorter distance by reason of whether there is a traffic light, quick movement, etc. Nevertheless, the autonomous driving technology of the related art cannot learn driving patterns that users want, so there is a problem that autonomous driving is performed on the basis of only the same driving pattern for all users who drive a vehicle.

SUMMARY

According to at least one embodiment, a driving pattern learning apparatus comprises a driving mode selection unit configured to receive one of an autonomous driving mode and a driving pattern learning mode using an input device, a driving pattern learning unit configured to learn a pattern of a user for at least one of acceleration, braking, steering, an inter-vehicle distance, a lane change, overtaking, or a response to road facilities on the basis of a process of driving by the user when the driving pattern learning mode is input, and a memory configured to store a driving pattern that the driving pattern learning unit learned.

According to another embodiment, a driving pattern learning method comprises a driving mode selection process of receiving one of an autonomous driving mode and a driving pattern learning mode using an input device, a driving pattern learning process of learning a pattern of a user for at least one of acceleration, braking, steering, an inter-vehicle distance, a lane change, overtaking, or a response to road facilities on the basis of a process of driving by the user when the driving pattern learning mode is input, and a storing process of storing a driving pattern learned in the driving pattern learning process.

The following reference identifiers may be used in connection with the accompanying drawings to describe exemplary embodiments of the present disclosure.

100: driving mode selection unit
110: driving pattern learning unit
112: acceleration pattern learning unit
114: braking pattern learning unit
116: steering pattern learning unit
120: driving environment input unit
130: storage unit (memory)
140: autonomous driving section determination unit
150: autonomous driving unit
160: driving route provision unit

DETAILED DESCRIPTION OF ILLUSTRATIVE EMBODIMENTS

A driving pattern learning apparatus according to an embodiment can learn a driving environment that a user wants and a driving pattern of the user.

The features of embodiments of the present disclosure are not limited to the features described above and other features will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject matter of the present disclosure will be omitted for the purpose of clarity and for brevity.

In describing the components of the embodiments, alphanumeric codes may be used such as first, second, i), ii), a), b), etc., solely for the purpose of differentiating one component from others but not to imply or suggest the substances, the order, or the sequence of the components. Throughout this specification, when parts "include" or "comprise" a component, they are meant to further include other components, not to exclude thereof unless there is a particular description contrary thereto.

Figure 1:
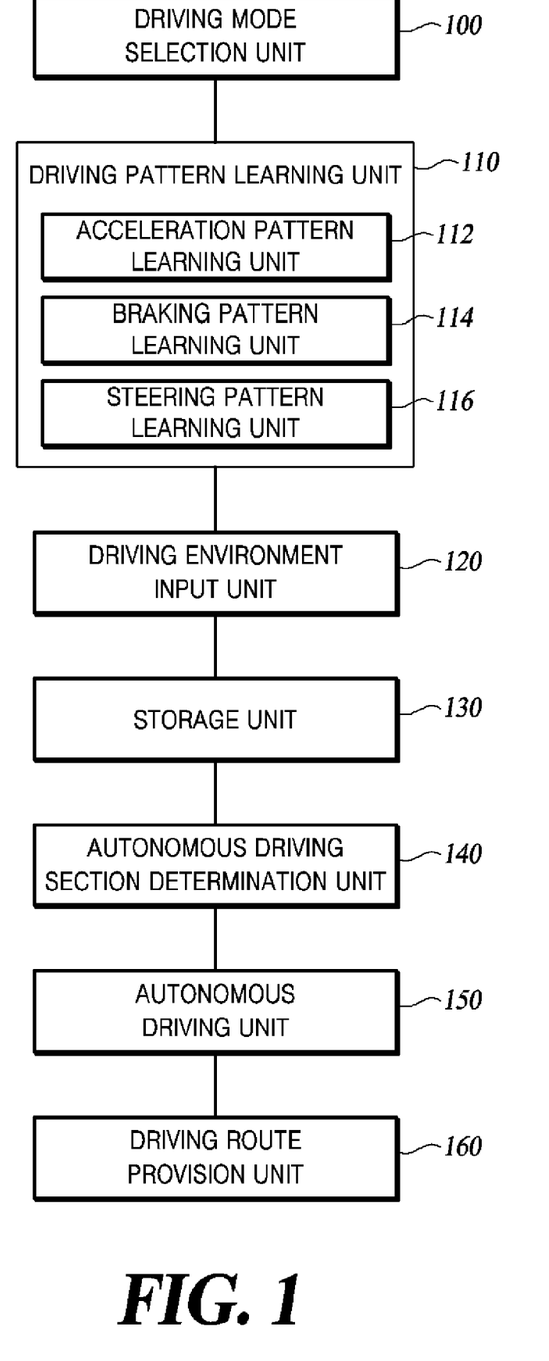
FIG. 1 is a configuration block diagram of a driving pattern learning apparatus according to an embodiment of the present disclosure.

FIG. 1 is a configuration block diagram of a driving pattern learning apparatus according to an embodiment of the present disclosure.

Referring to FIG. 1, a driving pattern learning apparatus includes all or some of a driving mode selection unit 100, a driving pattern learning unit 110, a driving environment input unit 120, a memory (i.e., a storage unit) 130, an autonomous driving section determination unit 140, an autonomous driving unit 150, and a driving route provision unit 160.

A user can input one driving mode of a plurality of driving modes using an input device. The driving mode selection unit 100 receives one driving mode input by a user. The driving modes, which are autonomous driving types that a user wants to use, may include an autonomous driving mode and a driving pattern learning mode. The autonomous driving mode is a mode that performs autonomous driving on the basis of pre-stored autonomous driving types, without intervention of a driver. The pre-stored autonomous driving types include an autonomous driving type fundamentally provided in an autonomous vehicle and an autonomous driving type stored on the basis of the driving pattern of a user.

The input device includes a touch screen, a Graphic User Interface (GUI), a voice recognition device, etc. When the input device is a touch screen, a user can input driving modes by touch icons displayed on the touch screen. When the input device is a GUI, a user can input driving modes by clicking displayed icons using a mouse cursor. When the input device is a voice recognition device, it is possible to input one driving mode by recognizing a voice of a driver.

When the autonomous driving section determination unit 140 determines that a vehicle has entered an autonomous driving section, the driving mode selection unit 100 can provide a pop-up window for a user to select one driving mode of a plurality of driving modes using the input device. The autonomous driving section determination unit 140 will be described in detail below.

When data about an input driving mode are not input for a preset time, the driving mode selection unit 100 may automatically select an autonomous driving basic mode. The autonomous driving basic mode is an autonomous driving mode that is provided when an autonomous vehicle is manufactured. In this case, the autonomous driving unit 150 performs autonomous driving on the basis of the autonomous driving basic mode. The autonomous driving unit 150 will be described in detail below.

The driving pattern learning unit 110 may include all or some of an acceleration pattern learning unit 112, a braking pattern learning unit 114, and a steering pattern learning unit 116. However, the acceleration pattern learning unit 112, the braking pattern learning unit 114, and the steering pattern learning unit 116 are only examples of components that the driving pattern learning unit 110 may include, and the driving pattern learning unit 110 may further include an inter-vehicle distance learning unit (not shown), a lane change learning unit (not shown), a road facility response learning unit (not shown), etc.

When an autonomous driving mode is input to the driving mode selection unit 100, the driving pattern learning unit 110 learns details of driving by the user. The learning type classifies details of driving by a user into categories of acceleration, braking, steering, an inter-vehicle distance, a lane change, overtaking, a response to road facilities, etc. The road facilities mean traffic lights, intersections, speed bumps, etc. As for the response to road facilities, for example, when the yellow light of a traffic light is turned on, a user A may pass the intersection by accelerating before the red light is turned on, but a user B may decelerate and stop. As described above, a response to road facilities depends on users.

The driving pattern learning unit 110 can determine a pattern that a user performs most as a main pattern for each category. The types of performing learning described above are exemplary types and the learning type of the present disclosure is not limited thereto.

A user can input a driving environment that he/she prefers. The driving environment herein means driving-assistance devices such as seats in a vehicle, side mirrors, rearview mirrors, etc. A user can input the positions and angles of driving-assistance devices on the basis of his/her body structure and the preferred driving environment. The driving environment input unit 120 can receive a driving environment that a user prefers from the input device.

The storage unit 130 receives and stores a learned driving pattern from the driving pattern learning unit 110 and receives and stores an input driving environment from the driving environment input unit 120.

When the memory 130 stores a learned driving pattern and an input driving environment, it is possible to store also names of the stored driving pattern and driving environment using the input device. For example, when a user whose name is James trains the driving pattern learning device from LA to Las Vegas, it is possible to store the learned driving pattern as "James".

After the memory stores a driving pattern and a driving environment, a user can input the newly stored driving pattern and driving environment using the input device.

The autonomous driving section determination unit 140 determines whether the section in which a vehicle is driven is a section in which autonomous driving is possible. The autonomous driving section determination unit 140 can perform Vehicle to Everything (V2X) communication using a communication terminal. V2X communication is a technology of exchanging various data by communicating with road facilities, etc. V2X communication includes Vehicle to Vehicle (V2V) communication, Vehicle to Infrastructure (V2I) communication, and Vehicle to Pedestrian (V2P) communication.

The autonomous driving unit 150 performs autonomous driving on the basis of one driving mode selected on the driving mode selection unit 100.

The driving route provision unit 160 creates a route to a destination. The route includes all of a shortest route and an optimal route from the current location of a user to a destination. The optimal distance means a route through which smooth driving is possible on the basis of a real-time traffic flow.

The driving route provision unit 160 can provide the created route to a driver using a visual and/or aural output device. The visual output device includes a Center Infotainment Display (CID), a cluster, a Rear Seat Entertainment (RSE), a Head Up Display (HUD), etc. The CID provides driving information of a vehicle and infotainment by communicating with a mobile and audio system. The cluster provides information for driving such as the speed of a vehicle, an RPM, a fuel amount, a collision warning, etc. The RSE is a display that is usually used for entertainment for the passengers in the rear seats of a vehicle, but also provides the driving state or navigation information of a vehicle. The HUD projects and provides a graphic image of the current speed, the remaining amount of fuel, navigation information, etc. of a vehicle on the windshield in front of a driver. However, the display is not limited thereto and may include any device that can provide a driver or passengers with visual information. The aural output device may be an audio system, a sound system, etc. in a vehicle.

Figure 2:
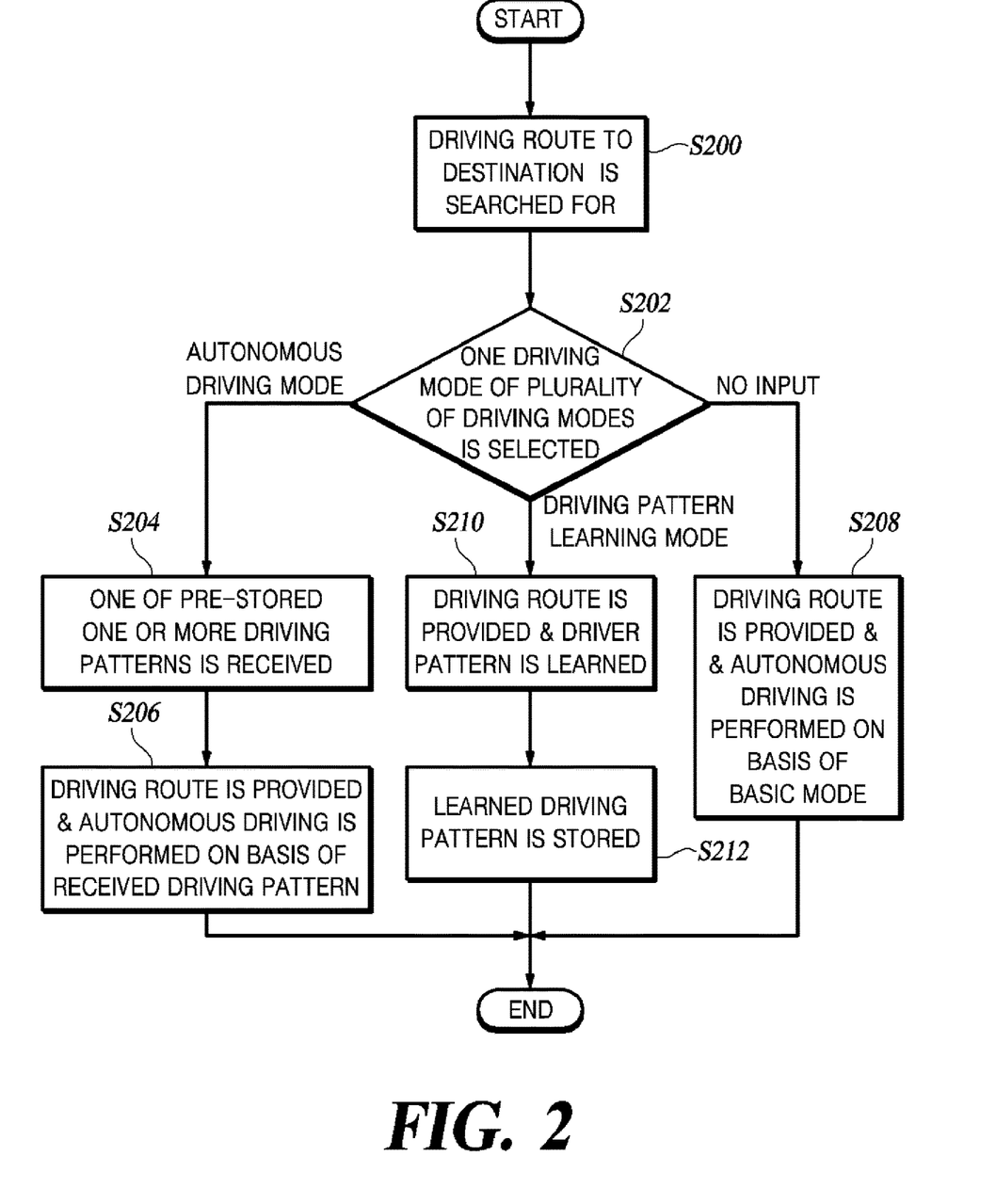
FIG. 2 is a flowchart of a driving pattern learning method according to an embodiment of the present disclosure.

FIG. 2 is a flowchart of a driving pattern learning method according to an embodiment of the present disclosure.

Referring to FIG. 2, the driving route provision unit 160 creates a route to a destination and provides the created route to a user (S200).

The driving mode selection unit 100 receives one driving mode of a plurality of driving modes (S202).

When an autonomous driving mode is input, the driving mode selection device 100 receives one driving pattern of pre-stored driving patterns (S204).

The autonomous driving mode 150 performs autonomous driving on the basis of the input autonomous driving mode. The driving route provision unit 160 provides a driving route to the user using a visual and/or aural output device (S206).

When there is no data input for a preset time, the driving mode selection unit 100 may select the pre-stored autonomous driving basic mode. The pre-stored autonomous driving basic mode means an autonomous driving mode that is provided when a vehicle is manufactured. The driving route provision unit 160 provides a driving route to the user using a visual and/or aural output device (S208).

When a driving pattern learning mode is input, the driving pattern learning unit 110 learns details of driving by the user. The driving route provision unit 160 provides a driving route to the user using a visual and/or aural output device (S210).

When learning of the driving pattern is finished, the storage unit 130 receives and stores the learned driving pattern from the driving pattern learning unit 110 (S212).

FIG. 3A to FIG. 3D are exemplary diagrams when a driving pattern learning apparatus according to an embodiment of the present disclosure receives one driving mode that is input through an input device.

Figure 3A:
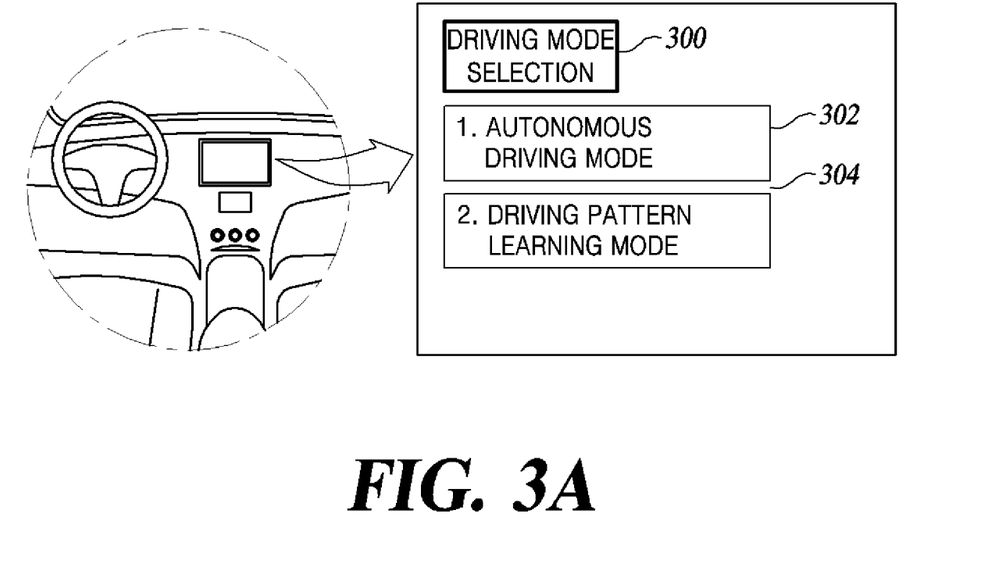
FIG. 3A to FIG. 3D are exemplary diagrams when a driving pattern learning apparatus according to an embodiment of the present disclosure receives one driving mode that is input through an input device.

Referring to FIG. 3A, there are a driving mode selection icon 300, an autonomous driving mode icon 302, and a driving pattern learning mode icon 304 on the display of an input device that uses a touch screen. A user can input desired driving modes by touching the icons corresponding to the driving modes.

Figure 3B:
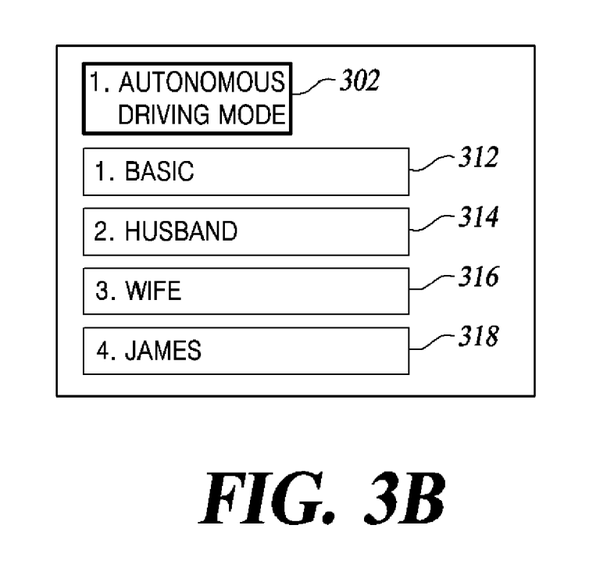

Referring to FIG. 3B, when a user touches and inputs the autonomous driving mode icon 302, a basic mode icon 312, a husband mode icon 314, a wife mode icon 316, and a James mode icon 318 are displayed. The husband mode, the wife mode, and the James mode are the names of driving patterns, respectively, and are driving patterns stored by different users or the same user as different driving types. The basic mode is the autonomous driving mode provided when the vehicle is manufactured.

Figure 3C:
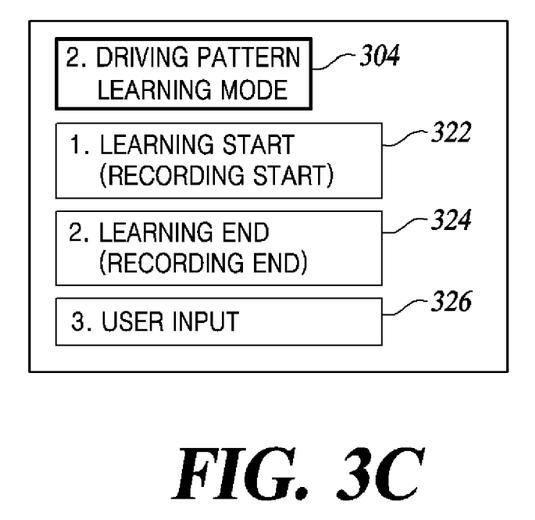

Referring to FIG. 3C, when a user touches and inputs the driving pattern learning mode icon 304 shown in FIG. 3A, a learning start icon 322, a learning end icon 324, and a user input icon 326 are displayed on the display of the input device.

Figure 3D:
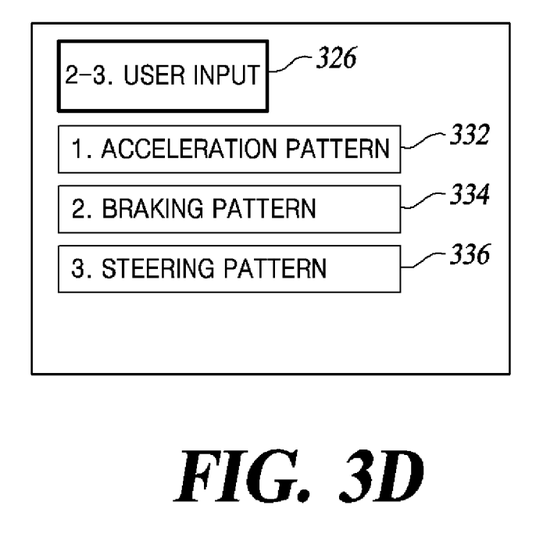

Referring to FIG. 3D, when a user touches and inputs the user input icon 326 shown in FIG. 3C, an acceleration pattern icon 332, a braking pattern icon 334, and a steering pattern icon 336 are displayed on the display of the input device. However, the icons 332, 334, and 336 are exemplarily shown, and an inter-vehicle distance icon (not shown), a lane change icon (not shown), an overtaking icon (not shown), a response-to-road facilities icons (not shown), etc. may be further included. A user can input details of acceleration, braking, and steering by touching the icons 332, 334, and 336, respectively. For example, the details of acceleration may be whether to suddenly start, the intensity of acceleration, the point in time and time of acceleration, etc.

Figure 4A:
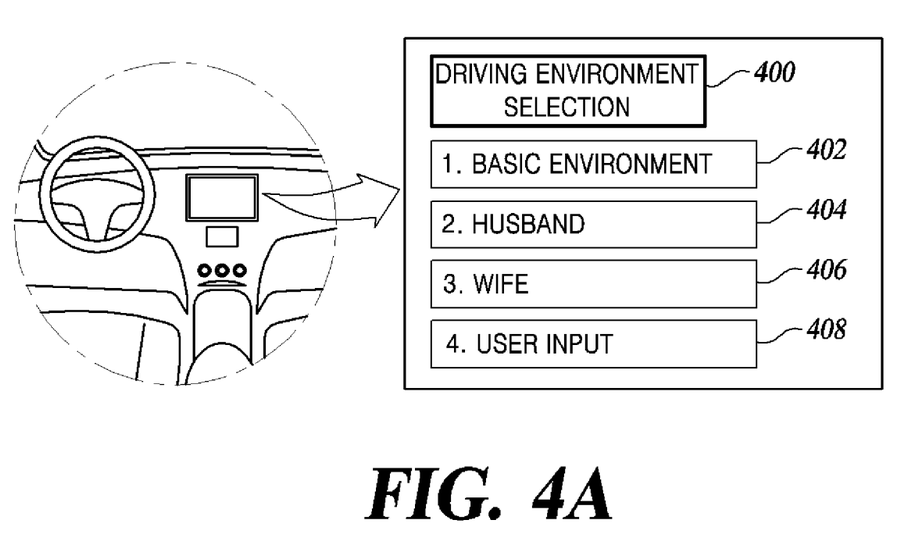
FIG. 4A to FIG. 4C are exemplary diagrams when a driving pattern learning apparatus according to an embodiment of the present disclosure receives one driving environment that is input through an input device.
Figure 4B:
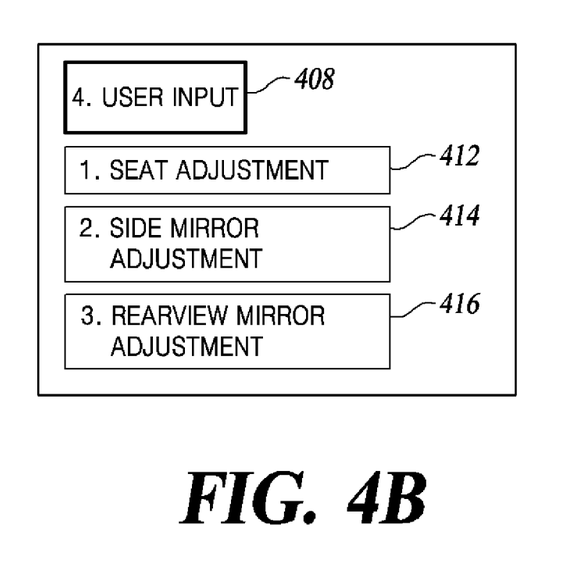
Figure 4C:
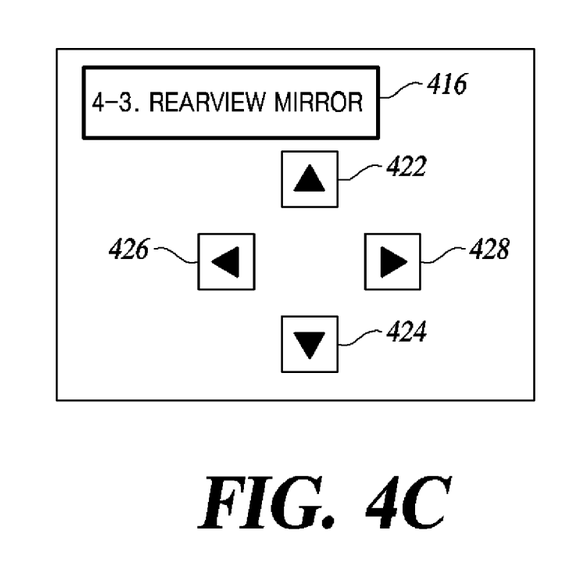

FIG. 4A to FIG. 4C are exemplary diagrams when a driving pattern learning apparatus according to an embodiment of the present disclosure receives one driving environment that is input through an input device.

Referring to FIG. 4A, there are a driving environment selection icon 400, a basic environment icon 402, a husband icon 404, a wife icon 406, and a user input icon 408 on the display of an input device that uses a touch screen. A user can input desired driving environments by touching the icons corresponding to the driving environments.

Referring to FIG. 4B, when a user touches and inputs the user input icon 408 shown in FIG. 4A, a seat adjustment icon 412, a side mirror adjustment icon 414, and a rearview mirror adjustment icon 416 are displayed on the display of the input device. However, the icons 412, 414, and 416 are only exemplarily shown and icons for various driving environments such as sound system setting, temperature control, etc. may be further included on the display of the input device.

Referring to FIG. 4C, when a user touches and inputs the rearview mirror adjustment icon 416 shown in FIG. 4B, icons for an up icon 422, a down icon 424, a left icon 426, and a right icon 428 are displayed on the display of the input device. The user can set the position and angle of the rearview mirror by touching the direction icons 422, 424, 426, and 428.

The flowcharts are described to sequentially perform the processes in the specification, but these are provided only to exemplarily describe the spirit of some embodiments of the present disclosure. In other words, the present disclosure may be changed and modified in various ways by those skilled in the art including some embodiments of the present disclosure by changing the processes described in the flowcharts of the present disclosure or performing one or more of the processes in parallel without departing from the fundamental characteristics of some embodiments of the present disclosure, so the flowcharts of the present disclosure are not limited to a time-series sequence.

Various embodiments of apparatuses and methods described herein may be implemented by a programmable computer. The computer is a programmable processor, a data storage system (including a volatile memory, a nonvolatile memory, or other types of storage systems, or a combination thereof), and at least one communication interface. For example, the programmable computer may be one of a server, a network device, a set-top box, a built-in device, a computer expansion module, a personal computer, a laptop, a personal data assistant (PDA), a cloud computing system, or a mobile device.

According to an embodiment, since the driving pattern learning apparatus can learn a driving pattern that a user prefers, the apparatus can perform autonomous driving on the basis of the learned driving pattern.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A driving pattern learning apparatus, the apparatus comprising:
   a driving mode selection unit configured to receive an autonomous driving mode or a driving pattern learning mode using an input device;
   a driving pattern learning unit configured to learn a driving pattern of a user comprising at least one of acceleration, braking, steering, an inter-vehicle distance, a lane change, overtaking, or a response to road facilities based on a process of driving by the user in the driving pattern learning mode;
   a driving environment input unit configured to receive at least one of inputs of a position and an angle of a seat, a side mirror, or a rearview mirror as a driving environment;
   a memory storing the driving pattern learned by the driving pattern learning unit, and the driving environment, wherein the driving pattern and the driving environment are associated with a name of the driving pattern, which is input by using the input device;
   wherein the input device is configured to display names of a plurality of stored driving patterns including driving patterns learned by different users, in response to a selection of the autonomous driving mode;
   wherein the driving mode selection unit is further configured to receive, via the input device, a selection of one driving pattern from among the plurality of stored driving patterns including driving patterns recorded by other users based on user interaction to the displayed names; and
   wherein the apparatus further comprises an autonomous driving unit configured to control a vehicle to autonomously drive based on the selected driving pattern.

2. The apparatus of claim 1, further comprising an autonomous driving section determination unit configured to determine whether a section in which a vehicle is driven is a section in which autonomous driving is possible.

3. The apparatus of claim 1, wherein the autonomous driving unit is configured to control the vehicle to autonomously drive based on an autonomous driving basic mode in response to no data being input to the driving mode selection unit for a preset time.

4. The apparatus of claim 1, wherein:
   the driving pattern learning unit is configured to receive data for the driving pattern using the input device, and
   the memory is configured to store the data as a new driving pattern.

5. The apparatus of claim 1, further comprising a driving route provision unit configured to receive a destination using the input device, to create a driving route from a current location of the user to the received destination, and to provide the driving route to the user using visual or aural output devices.

6. The apparatus of claim 2, wherein the autonomous driving section determination unit is configured to determine whether the section in which the vehicle is driven is the section in which autonomous driving is possible based on V2X communication using a communication terminal.

7. The apparatus of claim 2, further comprising a communication unit communicatively coupled to the autonomous driving section determination unit.

8. The apparatus of claim 1, wherein the autonomous driving unit is further configured to control the vehicle to autonomously drive along a driving route.

9. The apparatus of claim 8, further comprising a driving route provision unit configured to receive a destination using the input device and to create the driving route from a current location of the user to the received destination.

10. A driving pattern learning method, the method comprising:
    receiving a selection of an autonomous driving mode or a driving pattern learning mode using an input device;
    learning a driving pattern of a user for at least one of acceleration, braking, steering, an inter-vehicle distance, a lane change, overtaking, or a response to road facilities based on a process of driving by the user in the driving pattern learning mode;
    receiving, as a driving environment, at least one of inputs of a position and an angle of a seat, a side mirror, or a rearview mirror;
    storing the learned driving pattern and the driving environment, wherein the learned driving pattern and the driving environment are associated with a name of the learned driving pattern, which is input by using the input device;
    displaying names of a plurality of stored driving patterns including driving patterns learned by different users, in response to a selection of the autonomous driving mode;
    receiving, via the input device, a selection of one driving pattern from among the plurality of stored driving patterns including driving patterns recorded by other users based on user interaction to the displayed names; and
    controlling a vehicle to autonomously drive based on the selected driving pattern.

11. The method of claim 10, further comprising determining whether a section in which a vehicle is driven is a section in which autonomous driving is possible based on V2X communication using a communication terminal.

12. The method of claim 10, further comprising performing autonomous driving based on an autonomous driving basic mode in response to no data being input for a preset time in the autonomous driving mode.

13. The method of claim 10, further comprising:
    receiving data for the driving pattern using the input device; and
    storing the received data as a new driving pattern.

14. The method of claim 8, further comprising:
    receiving a destination using the input device;
    generating a driving route from a current location of the user to the received destination; and
    providing the driving route to the user using visual or aural output devices.

15. The method of claim 10, further comprising generating a driving route from a current location of the user to a destination, wherein the vehicle is controlled to autonomously drive according to the driving route.

16. The method of claim 15, wherein the destination is received from the input device.

17. A driving pattern learning system, the system comprising:
    a driving mode selection unit configured to receive an autonomous driving mode or a driving pattern learning mode using an input device;
    a driving pattern learning unit configured to learn a driving pattern of a user comprising at least one of acceleration, braking, steering, an inter-vehicle distance, a lane change, overtaking, or a response to road facilities based on a process of driving by the user in the driving pattern learning mode;
    a driving environment input unit configured to receive inputs of settings for driving-assistance units, wherein the settings for the driving-assistance units comprise at least one of a position and an angle of a seat, a side mirror, or a rearview mirror using the input device;

a memory configured to store the driving pattern learned by the driving pattern learning unit and the settings for the driving-assistance units, wherein the driving pattern and the settings for the driving-assistance units are associated with a name of the driving pattern, which is input by using the input device, the input device configured to display names of a plurality of stored driving patterns including driving patterns learned by different users, in response to a selection of the autonomous driving mode; and an autonomous driving unit configured to perform autonomous driving in the autonomous driving mode;

wherein the driving mode selection unit is further configured to receive, via the input device, a selection of one driving pattern from among the plurality of stored driving patterns including driving patterns recorded by other users based on user interaction to the displayed names; and wherein the autonomous driving unit is further configured to control a vehicle to autonomously drive based on the selected driving pattern.

18. The system of claim 17, further comprising an autonomous driving section determination unit configured to determine whether a section in which a vehicle is driven is a section in which autonomous driving is possible based on V2X communication using a communication terminal.

19. The system of claim 17, wherein the autonomous driving unit is configured to control a vehicle to autonomously drive based on an autonomous driving basic mode in response to a pre-stored driving pattern not being received by the driving mode selection unit during a preset time.

20. The system of claim 17, further comprising a driving route provision unit configured to receive a destination using the input device, to generate a driving route from a current location of the user to the received destination, and to provide the driving route to the user using visual or aural output devices.

* * * * *

UNITED STATES PATENT AND TRADEMARK OFFICE
CERTIFICATE OF CORRECTION

PATENT NO. : 12,330,676 B2
APPLICATION NO. : 18/049316
DATED : June 17, 2025
INVENTOR(S) : Kim et al.

Page 1 of 1

It is certified that error appears in the above-identified patent and that said Letters Patent is hereby corrected as shown below:

In the Claims

In Column 8, in Claim 14, Line 43, delete "claim 8," and insert -- claim 10, --.

Signed and Sealed this
Twenty-ninth Day of July, 2025

Coke Morgan Stewart
*Acting Director of the United States Patent and Trademark Office*